3,249,427
FERROUS ALLOY
Harry Owen Walp, Bywood Heights, Pa., assignor to SKF Industries, Inc., Philadelphia, Pa., a corporation of Pennsylvania
No Drawing. Filed Jan. 10, 1963, Ser. No. 250,507
10 Claims. (Cl. 75—126)

This invention relates to bearing assemblies and to novel ferrous alloys from which bearing assembly elements such as rings and rolling elements may be fabricated. More particularly, the present invention is concerned with ferrous alloys from which bearing assemblies of greatly increased resistance to fatigue can be made, and to bearing assemblies formed of such alloys.

The term "fatigue life" as used in connection with ball and roller bearings means that period of service which is limited by fatigue phenomena. If a bearing is effectively protected from moisture, dirt, etc., well lubricated, and otherwise properly handled, all causes of damage are eliminated except one, the fatigue of the material from which the bearing is formed due to repeated stresses under rotation. The effect of fatigue is a spalled area on one or the other of the load carrying surfaces.

Individual bearings which are apparently identical in form, composition, etc., may have different fatigue lives when operated under identical conditions. This dispersion makes it necessary to formulate a more precise definition of the term fatigue life. Therefore, the term "fatigue life" as used in this specification means that number of bearing revolutions, at a given speed of rotation, which is reached or exceeded by a given percentage of the bearings tested. This fatigue life is designated by the letter "L" followed by a number suffix. Thus, $L_{10}$ indicates that only 10% of a given lot of bearings have failed due to fatigue phenomena after a stated number of bearing rotations. Similarly $L_{50}$ indicates that only 50% have failed and $L_{90}$ that 90% have failed.

There has long been the need to increase the resistance of rolling contact bearing assemblies to fatigue. Expressed in different terms, there has been the need to increase the fatigue life of such bearings so that substantially higher $L_{10}$, $L_{50}$, etc. values are provided.

A principal object of this invention is to provide a novel ferrous alloy especially suitable for providing bearing assemblies with greatly increased resistance to fatigue.

Another object of this invention is to provide rolling contact bearing assemblies having improved resistance to fatigue.

Still another object of this invention is the provision of a novel ferrous alloy which when used to fabricate a plurality of identical bearing assemblies, will provide such assemblies with substantially greater fatigue life.

These and other objects of this invention will become further apparent from a consideration of this specification and appended claims.

According to this invention there is provided a novel ferrous alloy, particularly suitable for use in fabricating bearing assemblies of improved fatigue resistance, comprising:

| Element— | Percent by weight |
|---|---|
| Carbon | About 0.95 to about 1.10. |
| Chromium | About 1.30 to about 1.60. |
| Manganese | About 0.25 to about 0.45. |
| Silicon | About 0.20 to about 0.35. |
| Phosphorous | Up to about 0.025. |
| Sulfur | Up to about 0.025. |
| Aluminum | Up to about 0.015. |
| Copper | Up to about 0.060. |
| Molybdenum | Up to about 0.020. |
| Nickel | Up to about 0.080. |
| Vanadium | Up to about 0.003. |
| Iron | Remainder. | the respective amounts of the elements aluminum, copper, molybdenum, nickel and vanadium present in said alloy being such as to provide a value of $\phi$ not greater than about 3.5 in the formula:

$$\phi = \frac{Al}{0.015} + \frac{Cu}{0.060} + \frac{Mo}{0.020} + \frac{Ni}{0.080} + \frac{V}{0.003} \quad (I)$$

where the element symbols Al, Cu, Mo, Ni, and V represent the percent by weight of each such element present in said alloy. Preferably, $\phi$ in the above formula has a value not greater than about 3.0, and the elements aluminum, copper, molybdenum, nickel and vanadium are present in the following amounts.

| Element— | Percent by weight |
|---|---|
| Aluminum | Up to 0.010 |
| Copper | Up to 0.050 |
| Molybdenum | Up to 0.015 |
| Nickel | Up to 0.055 |
| Vanadium | Up to 0.002 |

It was discovered that when rolling contact bearing assemblies are formed of such an alloy, or at least the inner ring of such assemblies is formed therefrom, the assemblies have a substantially greater fatigue life than identical bearing assemblies formed of ferrous alloys heretofore considered most suitable for this purpose. Generally, this increase in fatigue life, expressed as $L_{10}$, will be of the order of 50 to 100%, and not infrequently will run as much as 200% greater than such prior known bearing assemblies. In some instances, this increase has been found to run as high as 900%.

In the alloys of this invention, the respective amounts of most of the various elements of which the alloy is comprised, as set forth above, should generally be utilized to obtain bearing assemblies of substantially improved fatigue resistance. Slight deviations therefrom may be tolerated, provided there is close control over the maximum amounts of the elements aluminum, copper, molybdenum, nickel and vanadium. In addition, the respective amounts of these elements should be such as to provide a $\phi$ value in Formula I not substantially greater than about 3.5. It was found that the elements aluminum, copper and vanadium, when present in amounts exceeding the above specified maximum amounts, substantially reduce fatigue resistance. Similarly, it was found that when the value of $\phi$ in Formula I exceeds about 3.5 by any substantial amount, there is a marked reduction in resistance to fatigue. Particularly useful alloys of this invention are those for which $\phi$ has a value of about 1 to about 3.

Rolling contact bearing assemblies of this invention may be formed entirely of the novel ferrous alloy described above, or one or more of the various elements forming such an assembly, such as the rings and rolling elements, whether they be in the form of spheres, cylinders, truncated cones, etc., may be formed therefrom. Since the inner ring usually first evidences fatigue, rolling contact bearing assemblies of this invention will ordinarily have at least the inner ring formed from such an alloy. Regardless of which element or elements of a bearing assembly are formed from the novel alloys, ordinarily the fatigue life of bearing assemblies of this invention, expressed as $L_{10}$, will be at least about 30% greater than identical bearing assemblies formed from alloys heretofore used in making such bearings.

Standard air melting practices may be used to produce the novel ferrous alloys of this invention. Electric arc and high frequency vacuum melt processes also may be employed. Preferably, the ferrous alloys of this invention are produced according to the consumable electrode, multiple vacuum melting process described and claimed in copending application Serial No. 315,086, filed October 9, 1963, and entitled Process for Treating Primarily Metallic Materials. In fabricating components for bearing assemblies according to the present invention, the various forging, rolling, heat treating, etc., steps heretofore used in making such components may be employed.

Although the alloys of this invention are particularly suitable for forming elements for bearing assemblies, they may find use wherever fatigue resistance is to be provided.

The following examples further illustrate the advantages of this invention and are not intended to limit the scope of this invention.

EXAMPLE I

The ferrous alloys of Table A were initially melted by commercial basic electric arc furnace practice. From each alloy a number of inner rings of deep-groove ball bearing assemblies was formed. These inner rings were used in making deep-groove ball bearing assemblies which differed only in inner ring alloy composition. Since the inner ring of deep-groove bearing assemblies generally first evidences fatigue failure, the use of bearings in which only the inner ring comprises the material to be tested for fatigue resistance is an accepted procedure. The bearing assemblies were tested for fatigue life, expressed as $L_{10}$, under substantial load and with grease lubrication.

Table A

| Element | Alloy A | Alloy B | Alloy C | Alloy D | Alloy E |
|---|---|---|---|---|---|
| Carbon | 1.08 | 0.99 | 1.05 | 1.04 | 1.04 |
| Manganese | 0.33 | 0.30 | 0.35 | 0.33 | 0.33 |
| Silicon | 0.38 | 0.38 | 0.29 | 0.27 | 0.32 |
| Phosphorus | 0.024 | 0.009 | 0.006 | 0.010 | 0.012 |
| Sulphur | 0.014 | 0.005 | 0.010 | 0.016 | 0.005 |
| Chromium | 1.40 | 1.47 | 1.42 | 1.47 | 1.44 |
| Aluminum | 0.007 | 0.006 | 0.010 | 0.034 | 0.052 |
| Copper | 0.019 | 0.060 | 0.070 | 0.072 | 0.110 |
| Molybdenum | 0.016 | 0.011 | 0.011 | 0.037 | 0.030 |
| Nickel | 0.013 | 0.070 | 0.074 | 0.011 | 0.100 |
| Vanadium | 0.0037 | 0.002 | 0.004 | 0.004 | 0.008 |
| $\phi$ | 2.98 | 3.50 | 4.65 | 6.79 | 10.72 |
| $L_{10}$ Life ($\times 10^6$) | 25.5 | 25.0 | 11.1 | 8.55 | 3.16 |
| Speed, r.p.m | 1,500 | 1,500 | 1,500 | 1,500 | 1,500 |

As can be seen by reference to Table A, the $L_{10}$ fatigue life of alloy A of this invention is about 200% of that of alloy C and about 800% that of alloy E.

EXAMPLE II

The ferrous alloys of Table B were initially melted by commercial basic electric arc furnace practice and then remelted under vacuum by the consumable electrode process. From each alloy a number of inner rings for deep-groove ball bearing assemblies was formed. These inner rings were used in making deep-groove ball bearing assemblies which differed only in inner ring alloy composition. The bearing assemblies were tested for fatigue life, expressed as $L_{10}$, under substantial load.

Table B

| Element | Alloy F | Alloy G | Alloy H |
|---|---|---|---|
| Carbon | 1.04 | 1.05 | 1.05 |
| Manganese | 0.26 | 0.32 | 0.26 |
| Silicon | 0.39 | 0.22 | 0.25 |
| Phosphorus | 0.006 | 0.015 | 0.010 |
| Sulphur | 0.006 | 0.015 | 0.013 |
| Chromium | 1.46 | 1.40 | 1.45 |
| Aluminum | 0.005 | 0.004 | 0.005 |
| Copper | 0.097 | 0.097 | 0.088 |
| Molybdenum | 0.010 | 0.018 | 0.034 |
| Nickel | 0.070 | 0.092 | 0.080 |
| Vanadium | 0.002 | 0.006 | 0.011 |
| $\phi$ | 3.21 | 5.95 | 8.17 |
| $L_{10}$ Life ($\times 10^6$) | 38.0 | 16.5 | 13.2 |
| Speed, r.p.m | 9,700 | 1,500 | 1,500 |

As can be seen by reference to Table B, the $L_{10}$ fatigue life of alloy F of this invention is more than twice that of alloy G and about three times that of alloy H.

While this invention has been described with particular reference to certain embodiments thereof, it will be understood that modifications and variations thereof can be made within the spirit and scope of the invention as set forth in the appended claims.

What is claimed is:

1. A ferrous alloy, particularly suitable for providing roller bearings of increased life, comprising:

| Element— | Percent by weight |
|---|---|
| Carbon | About 0.95 to about 1.10. |
| Chromium | About 1.30 to about 1.60. |
| Manganese | About 0.25 to about 0.45. |
| Silicon | About 0.20 to about 0.35. |
| Phosphorous | Up to about 0.025. |
| Sulfur | Up to about 0.025. |
| Aluminum | Up to about 0.015. |
| Copper | Up to about 0.060. |
| Molybdenum | Up to about 0.02. |
| Nickel | Up to about 0.080. |
| Vanadium | Up to about 0.003. |
| Iron | Remainder. |

The respective amounts of the elements aluminum, copper, molybdenum, nickel and vanadium present in said alloy being such as to provide a value of $\phi$ not greater than about 3.5 in the formula:

$$\phi = \frac{Al}{0.015} + \frac{Cu}{0.060} + \frac{Mo}{0.02} + \frac{Ni}{0.080} + \frac{V}{0.003}$$

where the element symbols Al, Cu, Mo, Ni and V represent the percent by weight of each such element present in said alloy.

2. A ferrous alloy according to claim 1 wherein $\phi$ has a value not greater than about 3.0.

3. A ferrous alloy according to claim 1 wherein $\phi$ has a value of from about 1.0 to about 3.0.

4. A ferrous alloy according to claim 1 comprising up to about 0.010% aluminum, up to about 0.050% copper, up to about 0.015% molybdenum, up to about 0.055% nickel and up to about 0.002% vanadium, and wherein said value of $\phi$ is not greater than about 3.0.

5. In a bearing assembly comprising radially spaced inner and outer race rings having raceways supporting and guiding a plurality of rolling elements, the improvement which comprises forming at least the inner race ring from the alloy of claim 1.

6. In a bearing assembly comprising radially spaced inner and outer race rings having raceways supporting and guiding a plurality of rolling elements, the improvement which comprises forming at least the inner race ring from the alloy of claim 4.

7. A race ring for a bearing assembly formed of the alloy of claim 1.

8. A race ring for a bearing assembly formed of the alloy of claim 4.

9. Rolling elements for a bearing assembly formed of the alloy of claim 1.

10. Rolling elements for a bearing assembly formed of the alloy of claim 4.

References Cited by the Examiner

A.S.T.M. Standards, Part I, Ferrous Metals Specifications, page 1158, published in 1961 by the American Society for Testing Materials, Philadelphia, Pennsylvania, on file in Group 110 of the U.S. Patent Office.

Sullivan, J. D.: A.I.M.E. "Open Hearth Proceedings," vol. 38, 1955, pages 130–138.

DAVID L. RECK, *Primary Examiner*.

P. WEINSTEIN, *Assistant Examiner*.